(12) United States Patent
Nakamura

(10) Patent No.: US 7,147,289 B2
(45) Date of Patent: Dec. 12, 2006

(54) WHEEL COVER FOR AUTOMOTIVE VEHICLES

(75) Inventor: Takao Nakamura, Yokohama (JP)

(73) Assignee: Altia Hashimoto Co., Ltd., Kawasaki (JP)

( * ) Notice: Subject to any disclaimer, the term of this patent is extended or adjusted under 35 U.S.C. 154(b) by 75 days.

(21) Appl. No.: 11/013,712

(22) Filed: Dec. 17, 2004

(65) Prior Publication Data

US 2005/0134107 A1 Jun. 23, 2005

(30) Foreign Application Priority Data

Dec. 19, 2003 (JP) ............................. 2003-423479

(51) Int. Cl.
*B60B 7/10* (2006.01)
(52) U.S. Cl. ............................ 301/37.28; 301/37.31; 301/37.41
(58) Field of Classification Search ........... 301/37.101, 301/37.102, 37.28, 37.31, 37.34, 37.41, 6.3
See application file for complete search history.

(56) References Cited

U.S. PATENT DOCUMENTS

| | | | | | |
|---|---|---|---|---|---|
| 2,175,044 | A | * | 10/1939 | Van Halteren | ................ 301/6.6 |
| 2,212,039 | A | * | 8/1940 | Lyon | ...................... 301/37.101 |
| 2,717,179 | A | * | 9/1955 | Pipes et al. | .............. 301/37.31 |
| RE24,995 | E | * | 6/1961 | Lyon | ...................... 188/264 W |
| 6,247,760 | B1 | * | 6/2001 | Kinoshita | ................ 301/37.34 |

FOREIGN PATENT DOCUMENTS

| JP | A 2000-006602 | 1/2000 |
|---|---|---|
| JP | A 2001-225603 | 8/2001 |
| JP | A 2002-059702 | 2/2002 |

\* cited by examiner

*Primary Examiner*—Russell D. Stormer
(74) *Attorney, Agent, or Firm*—Oliff & Berridge, PLC

(57) ABSTRACT

A wheel cover (10) has a plurality of vent holes (15) along an outer peripheral portion of a wheel cover body (11) at positions opposed to solid portions (8) between disc openings (6) in a road wheel (1). An engagement member (12) projects from the edge portion (16) of the vent hole (15), toward the wheel disc (2) of the road wheel (1). A disc-locking portion (18) projects from the tip end portion of the engagement member (12), toward the vent hole (15), and preferably includes locking protrusions (31, 32) engageable with a peripheral portion (7) of the disc opening (6), so that a retainer (24) is engaged with a retainer locking concave portion (35) to urge and hold the disc-locking portion (18).

18 Claims, 8 Drawing Sheets

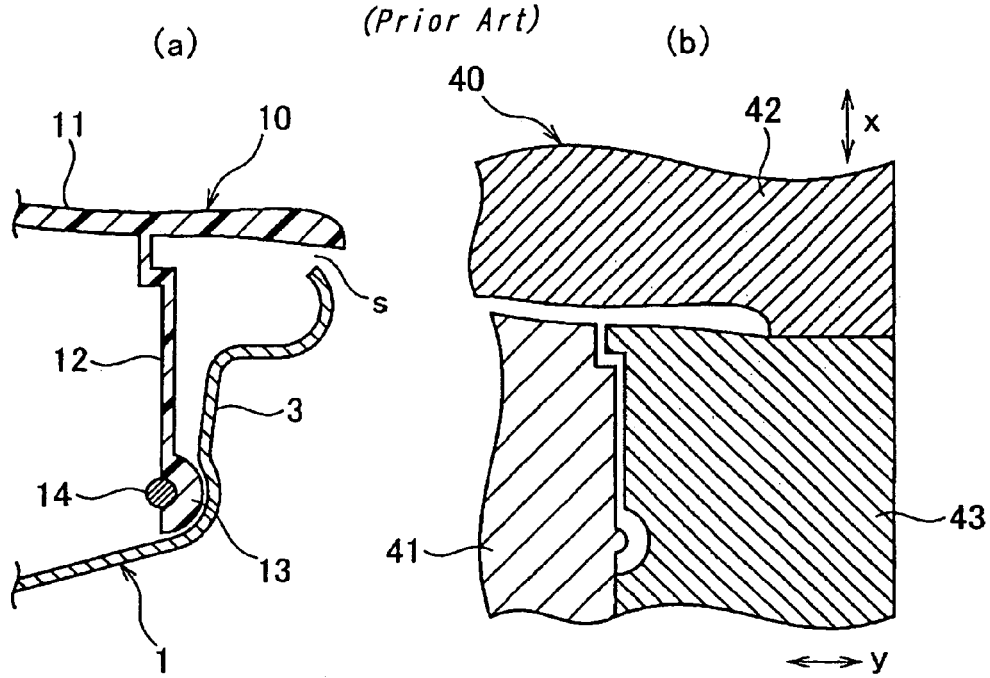
FIG. 2 (Prior Art)
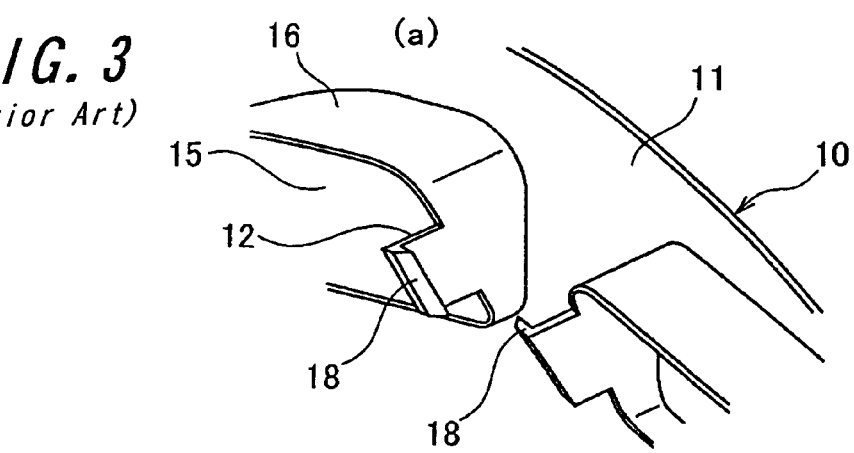
FIG. 3 (Prior Art)
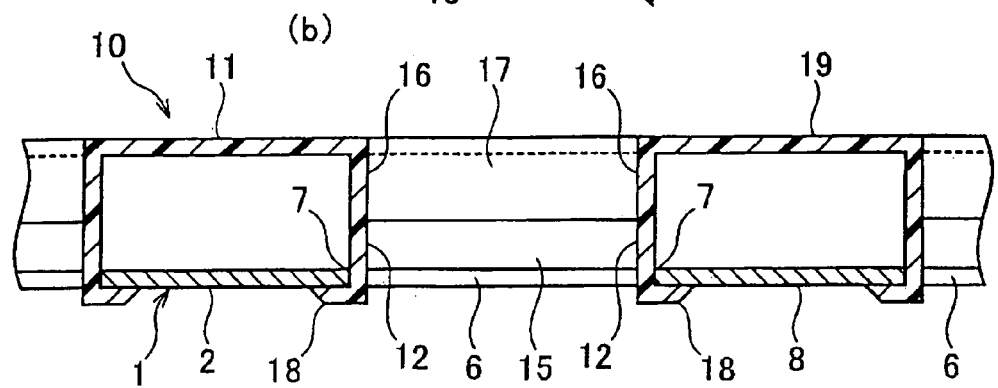

FIG. 4
(a)
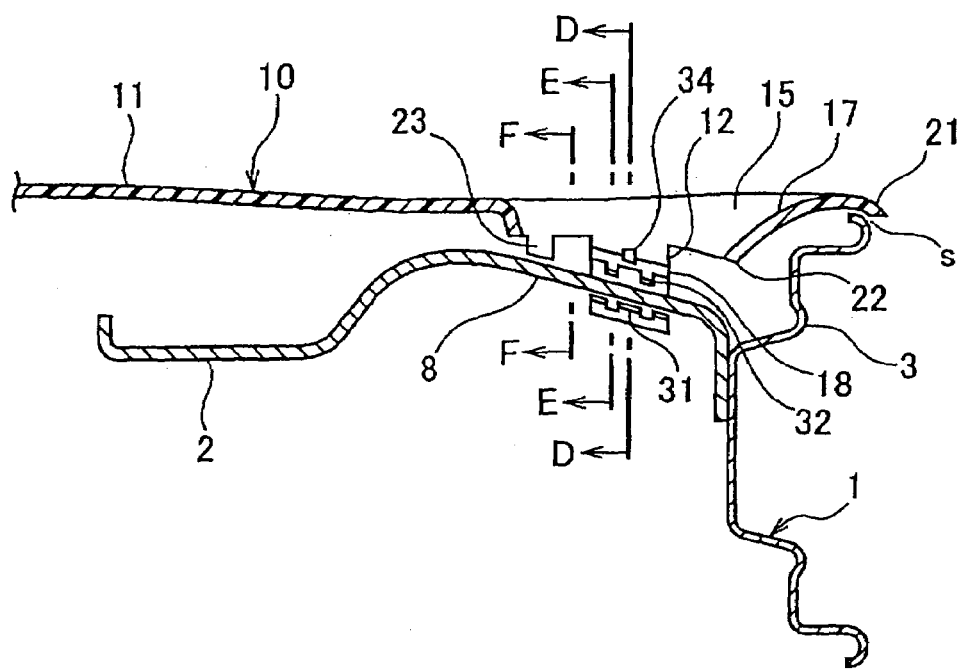
(b)
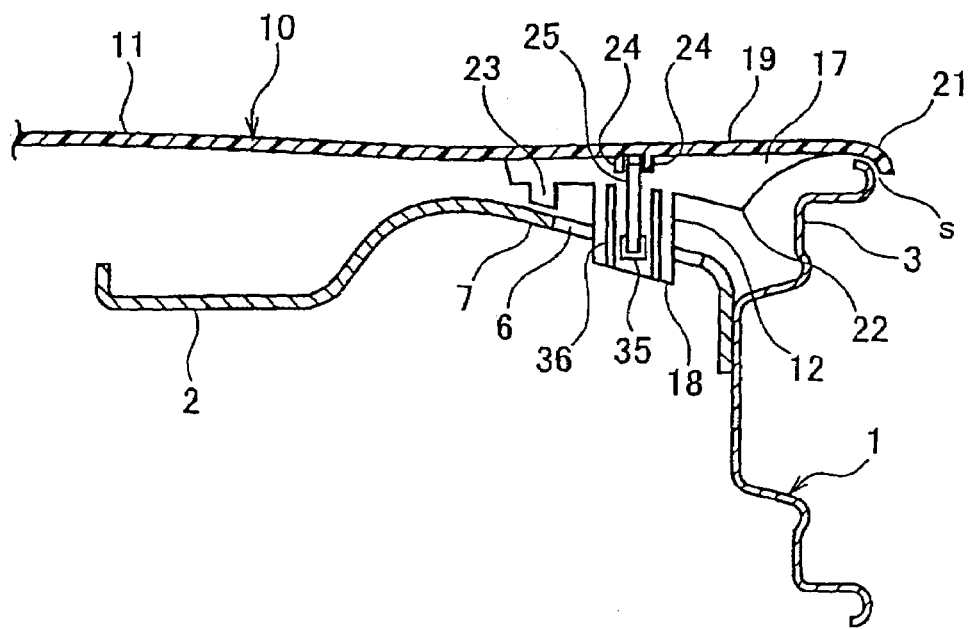

FIG. 6
(a)
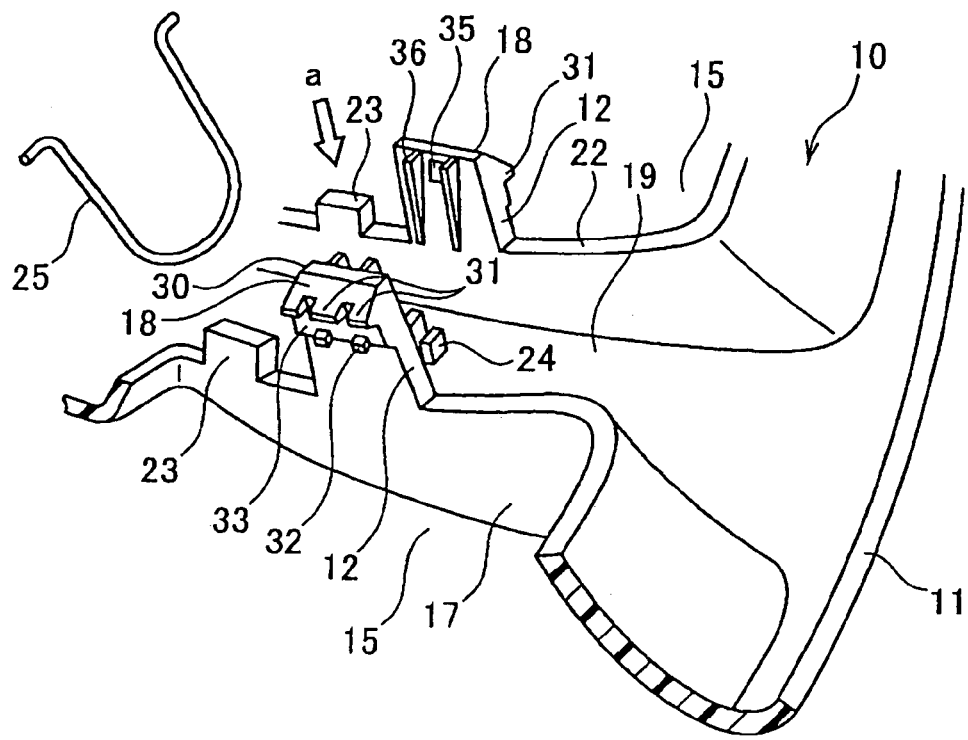
(b)
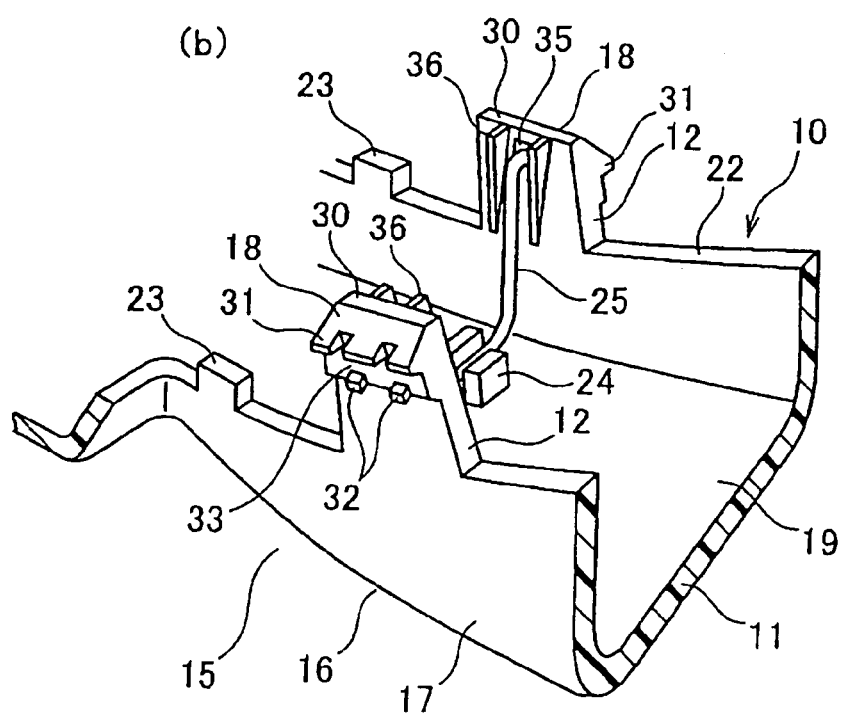

FIG. 8
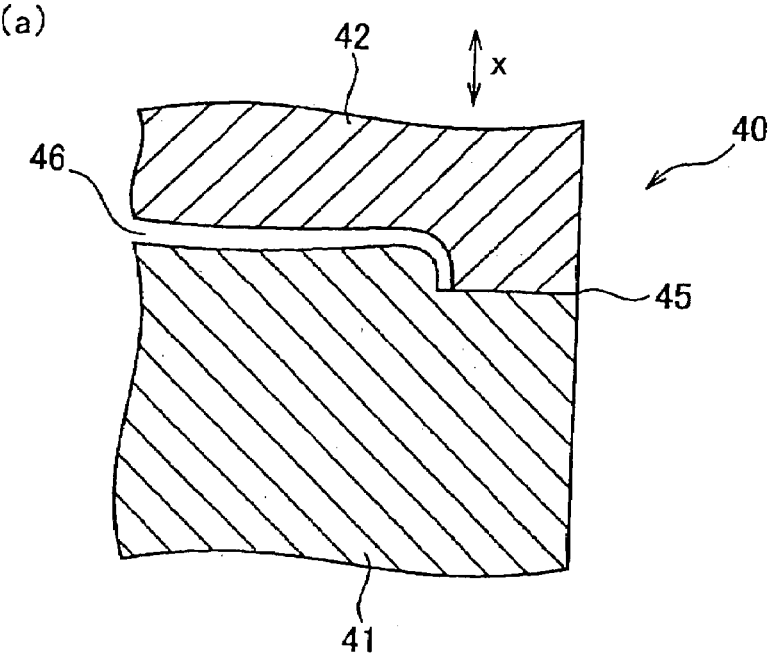
(a)
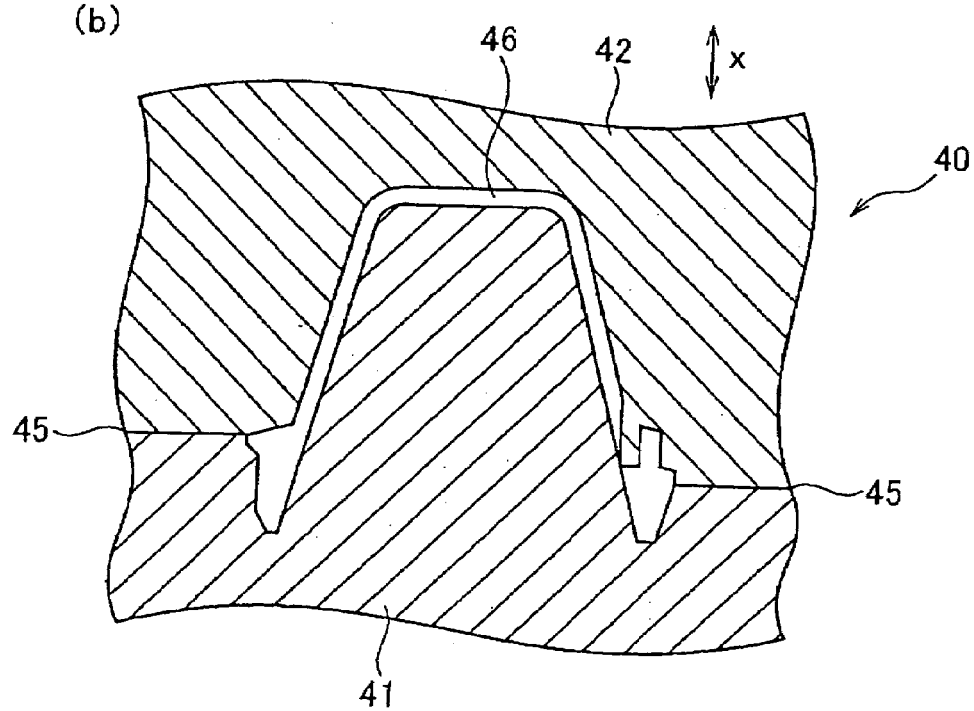
(b)

FIG. 9
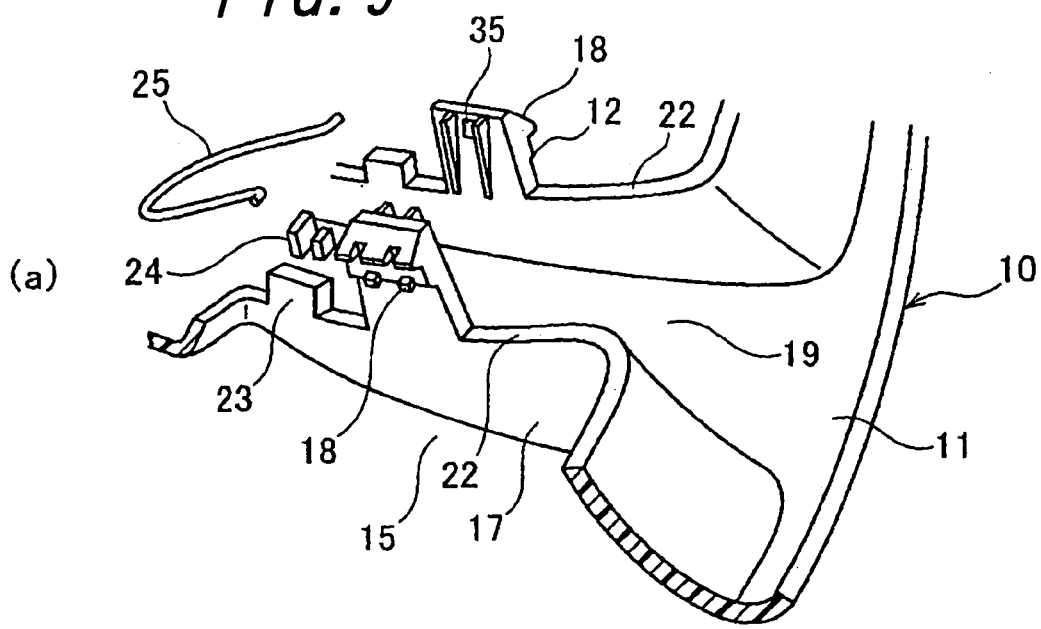
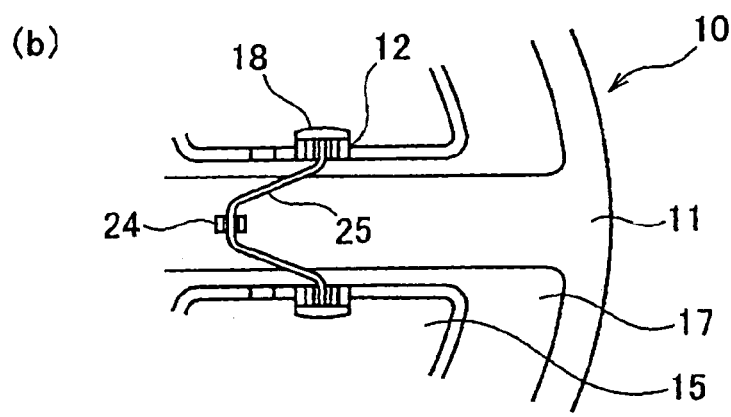
FIG. 10
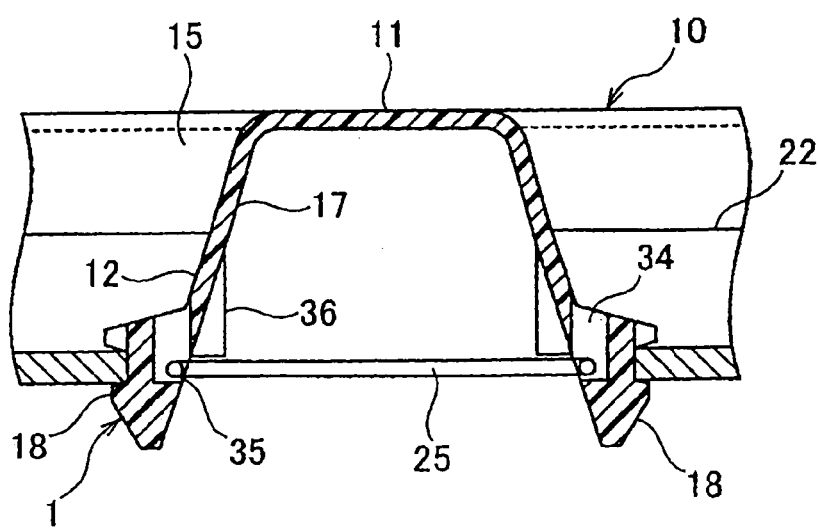

US 7,147,289 B2

WHEEL COVER FOR AUTOMOTIVE VEHICLES

BACKGROUND OF THE INVENTION

1. Technical Field

The present invention relates to a wheel cover for automotive vehicle, which can be detachably mounted onto a wheel disc of a vehicle road wheel, for protective and/or ornamental purposes.

2. Related Art

As shown in FIGS. 1(a) and 1(b), a road wheel 1 for use with a wheel cover includes a wheel disc 2 secured to an axle of a vehicle, and a wheel rim 3 for mounting a tire thereon. The wheel disc 2 has an axel-mounting hole 4 at its the center portion, bolt holes 5 for securing the road wheel 1 to the axle, which are aligned in the circumferential direction on the radially outer side of the axel-mounting hole 4, and disc openings 6 for dissipating heat, which are aligned in the circumferential direction on the radially outer side of the bolt holes 5. The wheel cover is detachably mounted onto the wheel rim 3, as shown in FIG. 1(c), so as to cover the wheel disc 2 of the road wheel 1 from an outer side.

A typical example of conventional wheel cover as disclosed, for example, in JP 2002-59702 A2 will be described below with reference to FIGS. 2(a) and 2(b). In this instance, the wheel cover 10 includes a wheel cover body 11 made of a rigid synthetic resin, an engagement member 12 integrally projecting from the back surface side of the wheel cover body 11 so as to engage with the wheel rim 3, and a claw-shaped rim-locking portion 13 at the tip end portion of the engagement member 12, which engages with the internal surface of the wheel rim 3. The wheel cover 10 is detachably mounted onto to the road wheel by deflecting the engagement member 12 so that the rim-locking portion 13 of the engagement member 12 is resiliently engaged with the internal surface of the wheel rim 3. On this occasion, the rim-locking portion 13 is biased radially outwards against the inner side of the wheel rim 3 by the resiliency of a ring-shaped retainer 14, so as to stably maintain the wheel cover 10 in place and prevent its withdrawal from the rim 3, for example, under vibrations caused during running, etc.

However, due to the provision of the claw-shaped rim locking portion 13 at the tip end of the engagement member 12 in order to obtain the retaining force for the wheel cover 10 with respect to the road wheel 1, the conventional wheel cover 10 shown in FIG. 2(a) suffers from a problem that is associated with the production technology. More specifically, while such a wheel cover 10 is usually manufactured by injection molding process, the claw-shaped rim locking portion 13 forms an undercut. Thus, as shown in FIG. 2(b), an injection molding die 40 for such a wheel cover 10 cannot be formed only by a stationary die plate 41, and a movable die plate 42 that is movable in the axial direction indicated by arrow x, toward and away from the stationary die plate 41. An additional slide mold member 43 is required for each rim locking portion 13, which must be movable in the radial direction indicated by arrow y, toward and away from the stationary die plate 41, with the result that the injection molding system as a whole becomes large in size and complicated in structure. Also, in order to prevent generation of noise under vibrations, the wheel cover 10 is mounted leaving a gap s between the outer peripheral portion of the wheel cover 10 and the opposite peripheral portion of the road wheel 1. In this instance, by using the slide mold members 43, the gap s is formed at a readily visible position, thereby degrading the appearance of the wheel cover 10.

Besides, about six to twelve rim locking portions 13 are generally provided for an ordinary wheel cover, depending upon the diameter of the wheel cover body. The rim locking portions 13 must be large in size and complicated in shape, in order to allow stable engagement of the ring-shaped retainer 14. Therefore, formation of such plurality of rim locking portions 13 not only increases the weight of the wheel cover 10, but also requires the provision of corresponding number of slide mold members 43, i.e., six to twelve slide mold members 43. As a result, the injection mold system as a whole becomes large in size and complicated in structure, thereby increasing the manufacturing cost of the wheel cover.

Another example of conventional wheel cover as disclosed, for example, in JP 2001-225603 A2 will be described below with reference to FIGS. 3(a) and 3(b). In this instance also, the wheel cover 10 includes a wheel cover body 11 made of a rigid synthetic resin, and has vent holes 15 that are arranged close to, and aligned along the outer peripheral portion of the wheel cover body 11. A conical wall 17 projects from an edge portion 16 of the vent hole 15 in the direction substantially perpendicular to the back surface of the wheel body 11. The engagement member 12 extends from a part of the conical wall 17, and a claw-shaped disc-locking portion 18 projects from the tip end portion of the engagement member 12 and folded toward the neighboring vent hole 15, over a bridge portion 19 between the vent holes 15, so as to be engageable with the peripheral portion 7 of the disc opening 6 in the wheel disc 2 of the road wheel 1. This wheel cover 10 is detachably mounted onto the road wheel 1, as follows. The wheel cover body 11 is first of all placed to face the wheel disc 2 of the road wheel 1 so that the vent holes 15 substantially coincide with the disc openings 6 in the wheel disc 2. Then, the engagement member 12 is deflected and the disc-locking portion 18 is inserted into the disc opening 6 in the wheel disc 2 of the road wheel 1. Finally, the engagement member 12 is resiliently engaged with the road wheel 1, with the disc-locking portion 18 in engagement with the peripheral portion 7 of the disc opening 6.

However, in the wheel cover 10 shown in FIGS. 3(a) and 3(b) also, the claw-shaped disc-locking portion 18 projecting from the tip end portion of the engagement member 12 is folded over the bridge portion 19, thereby causing undercut when the wheel cover is manufactured by injection molding. Thus, the slide mold members 43 such as that shown in FIG. 2(b) are still needed, with the result that the injection mold system becomes large in size and complicated in structure. Moreover, the engagement of the wheel cover with the road wheel is achieved solely by the disc-locking portion 18 made of synthetic resin, which may undergo thermal deformation during running of the vehicle, with the result that the wheel cover 10 tends to be readily detached during running.

Furthermore, JP 2000-6602 A2 (or U.S. Pat. No. 6,247, 760 B1) discloses a wheel cover having a spoke-shaped wheel disc. In this instance, the engagement member is provided on the back surface of the wheel cover body so as to be engageable with the spoke portion of road wheel. Basically, however, this wheel cover is essentially the same as the wheel cover shown in FIGS. 3(a) and 3(b), both in terms of its mounting structure and associated problems including the requirement for the slide mold members to form the engagement claws. Also, since the wheel cover is engaged with the metallic road wheel by metallic hooks, the surface layer on the road wheel tends to be gradually peeled off during long-term use or by repeated attachment and detachment, thereby causing premature rusting.

DISCLOSURE OF THE INVENTION

It is a primary object of the present invention to provide a vehicle wheel cover that can be readily manufactured at low cost without requiring slide mold members. The wheel cover according to the present invention should be light in weight, should exhibit sufficient holding force with respect to the road wheel, and/or should have inconspicuous gap between the wheel cover and the road wheel in order to avoid degradation of the appearance.

According to the present invention, there is provided a wheel cover to be detachably mounted onto a road wheel of an automotive vehicle, said road wheel having a wheel disc with disc openings, wherein the wheel cover comprises: a wheel cover body having a plurality of vent holes along the circumferential direction at positions opposed to positions of said road wheel between the disc openings in the wheel disc; an engagement member projecting from a peripheral portion of said vent hole toward the wheel disc when the wheel cover is in use; and a disc-locking portion projecting toward the vent hole from a tip end portion of said engagement member so as to engage with a peripheral portion of said disc opening of the wheel disc.

The vehicle wheel cover having such a novel structure according to the present invention can be readily manufactured at low cost, without requiring slide mold members, can be made light in weight, exhibits a large holding force with respect to the road wheel, and has an inconspicuous gap between the wheel cover and the road wheel so as to effectively avoid degradation of the appearance.

It is assumed that the wheel cover according to the present invention is used in combination of a road wheel, which includes a wheel disc secured to an axle of the vehicle, and a wheel rim for mounting a tire thereon, wherein the wheel disc has disc openings. The wheel disc and wheel rim may be separate elements, which are assembled with each other in use, or they may be formed integrally. The disc opening in the wheel disc is generally circular or elliptical in shape, though different shape may be adopted, if necessary or desired. For example, the wheel disc may be spoke-shaped wherein the disc openings are formed between the spokes. The disc openings are generally formed along the circumferential direction in the peripheral portion of an axel-mounting hole at the center, though other arrangements may also be adopted.

It is preferred that the vehicle wheel cover according to the present invention comprises an integrally molded product made of a rigid resin having high rigidity and bending elasticity, such as ABS resin, polycarbonate resin, polyamide resin, or polymer alloy of polycarbonate/acrylonitrile-butadiene-styrene (PC/ABS) copolymer.

It is preferred that the wheel cover body has a circular shape so as to cover the wheel disc on the outer side of the road wheel, though the wheel cover body may have a different shape, or may be formed so as to cover the at least a part of the wheel rim as well. The engagement member preferably projects with inclination toward the vent hole, so as to increase the spring elasticity and allow a concave portion for locking a retainer to be formed easily. However, the engagement member may project at right angles or with other inclination angle. The disc-locking portion is engageable with the peripheral portion of the disc opening in the wheel disc, and projects toward the vent hole on the side opposite to a bridge portion between the vent holes, without being folded from the tip end portion of the engagement member. Preferably, the disc-locking portion includes a first locking protrusion engageable with the back surface side at the peripheral portion of the disc opening, and a second locking protrusion engageable with the outer surface side at the peripheral portion of the peripheral portion, wherein the first and second locking protrusions are arranged at mutually offset positions, without being aligned with each other.

It is preferred that the wheel cover includes a retainer for biasing the disc-locking portion toward the vent hole so as to enhance the holding properties of wheel cover. The retainer is preferably made of a wire material having spring properties, such as stainless steel wire, etc., though it may be of different material and/or shape. The retainer is preferably associated with a pair of engagement members, which are adjacent to each other on opposite sides of a bridge portion between the vent holes, such that these engagement members are biased by the retainer away from each other, toward the respective vent holes. The engagement member preferably has a retainer locking portion for locking the retainer, wherein the retainer locking portion may have a concave shape on the back surface between the first and the second locking protrusions. Also, the wheel cover body preferably has a holding portion for holding the retainer.

The present invention further provides a method for manufacturing a wheel cover having the above-mentioned novel features. Thus, according to the present invention, there is provided a method for manufacturing a wheel cover, wherein resin is injected into a mold cavity defined between a stationary die plate and a movable die plate of an injection molding die, and wherein the injection molding die has parting surfaces at a peripheral portion of the wheel cover body and at a tip end portion of the disc-locking portion. In order that the inclined engagement member can be formed easily by injection molding, the mold cavity of the injection molding die preferably comprises a cavity portion for the inclined engagement member between correspondingly inclined mold surfaces of the stationary die plate and the movable die plate. In this instance, it is preferred that one of the stationary die plate and the movable die plate has an inclined mold surface, a part of which is projected toward, and biased against the opposite surface of the other of the stationary die plate and the movable die plate, so as to form a concave portion for locking a retainer of the wheel cover, which serves to bias said disc-locking portion toward the vent hole.

With such a method, the wheel cover according to the present invention can be readily manufactured at low cost by an injection molding process using an injection molding die having a stationary die plate and a movable die plate, without requiring the slide mold members as in the prior art. By forming the mold cavity portion for the inclined engagement member between the inclined mold surfaces of the stationary die plate and the movable die plate, the inclined engagement member can be formed easily by injection molding. Also, by having part of inclined mold surface of the stationary die plate and movable die plate to project into contact with each other, the concave portion for locking the retainer can be formed easily only by the stationary die plate and movable die plate.

The above-described method ensures that the wheel cover according to the present invention can be manufactured by using an injection mold system having a simple structure, by simple operations with high efficiency and productivity, and at low cost.

The wheel cover according to the present invention can be detachably mounted onto the road wheel, by arranging the wheel cover body so as to face the wheel disc such that the vent holes substantially coincide with the solid portions of the road wheel between the disc openings in the wheel disc, by deflecting the engagement member and inserting the disc-locking portion into the disc opening in the wheel disc, and by resiliently engaging the disc-locking portion of the engagement member with the peripheral portion of the disc opening.

The mounting work of the wheel cover can be performed easily and in short a time, since all what is required is to deflect the engagement member and lock the disc-locking portion to the peripheral portion of the disc opening. In the mounted state of the wheel cover, the disc-locking portion is locked to the peripheral portion of the disc opening, and the engagement member is installed in resiliently engaged state. Thus, the wheel cover is stably maintained in its mounted state, under a large holding force with respect to the road wheel. Since the wheel cover body can be formed so as to cover the peripheral portion of the wheel rim, even if a gap is formed between the wheel cover body and the wheel rim, the gap is inconspicuous and the appearance of the wheel cover is thus not degraded in its mounted state.

When retainers are included in the wheel cover for biasing the disc-locking portion toward the vent hole, each retainer is held by the retainer-holding portion and locked to the retainer locking portion so as to bias the disc-locking portion toward the vent hole. It is unnecessary to use a large retainer as would be required by the prior art need, so that the thickness of the engagement member can be reduced and the wheel cover can be made light in weight. The retainer biases the disc-locking portion so that the locking surface of the disc-locking portion is pressed toward the peripheral portion of the disc opening. It is thus possible to increase the locking force and, hence, the holding force of the wheel cover. If the retainer biases the disc-locking portion so that a pair of the engagement members, which are adjacent to each other on opposite sides of a bridge portion between the vent holes, are biased by the retainer away from each other, toward the respective vent holes, it is possible to achieve even higher pressing efficiency, which serves to reduce the weight and increase the holding force.

BRIEF DESCRIPTION OF THE DRAWINGS

The present invention will be further described below with reference to the preferred embodiment shown n the accompanying drawings.

FIG. 2(a) is a sectional view of a conventional wheel cover, and FIG. 2(b) is a sectional view showing an injection molding die for manufacturing the wheel cover.

FIG. 3(a) is a perspective view showing the back surface of another conventional wheel cover, and FIG. 3(b) is a sectional view showing the wheel cover mounted in place.

FIGS. 4(a) and 4(b) are sectional views of the wheel cover according to one embodiment of the present invention, taken along the lines B—B and C—C of FIG. 1(c), respectively.

FIGS. 6(a) and 6(b) are perspective views showing the back surface of the wheel cover of FIGS. 4(a) and 4(b).

FIG. 8(a) is a sectional view showing the peripheral portion of an injection molding die, and FIG. 8(b) is a sectional view thereof, corresponding to G—G section in FIG. 7(b).

FIG. 9(a) is a perspective view showing a part of the back surface of the wheel cover according to a modified embodiment of the present invention, and FIG. 9(b) is a view showing the back surface thereof.

FIG. 10 is a sectional view corresponding to D—D section in FIG. 4(a), showing a wheel cover according to a further modified embodiment of the present invention.

It is to be understood that, throughout the drawing figures, the same reference numerals are used to denote the same or functionally equivalent elements.

BEST MODE FOR CARRYING OUT THE INVENTION

Figure 1:
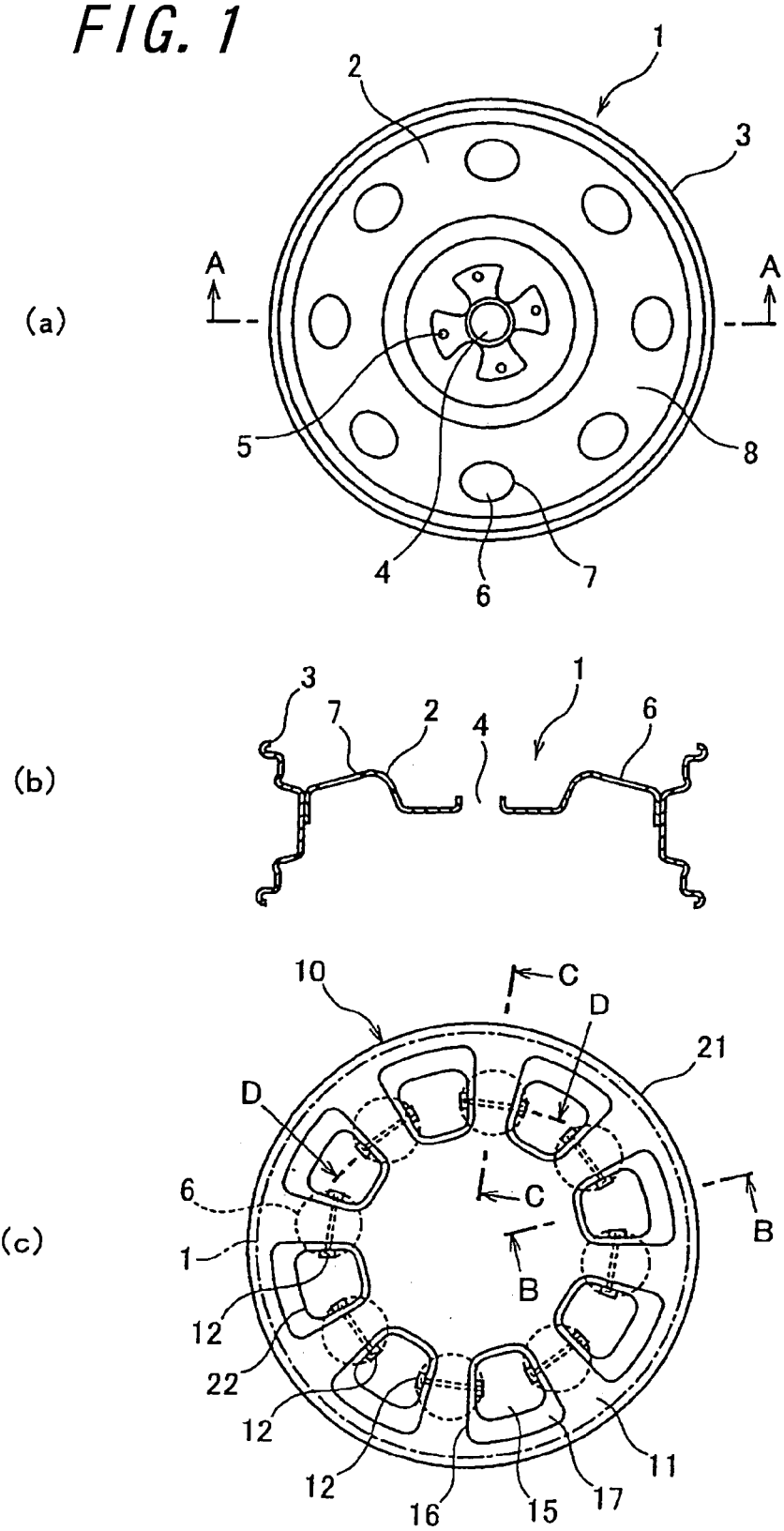
FIG. 1(a) is a front view of a vehicle road wheel suitable for use with the wheel cover according to the present invention.
FIG. 1(b) is a sectional view taken along the line A—A of FIG. 1(a)
FIG. 1(c) is a front view thereof.
Figure 5:
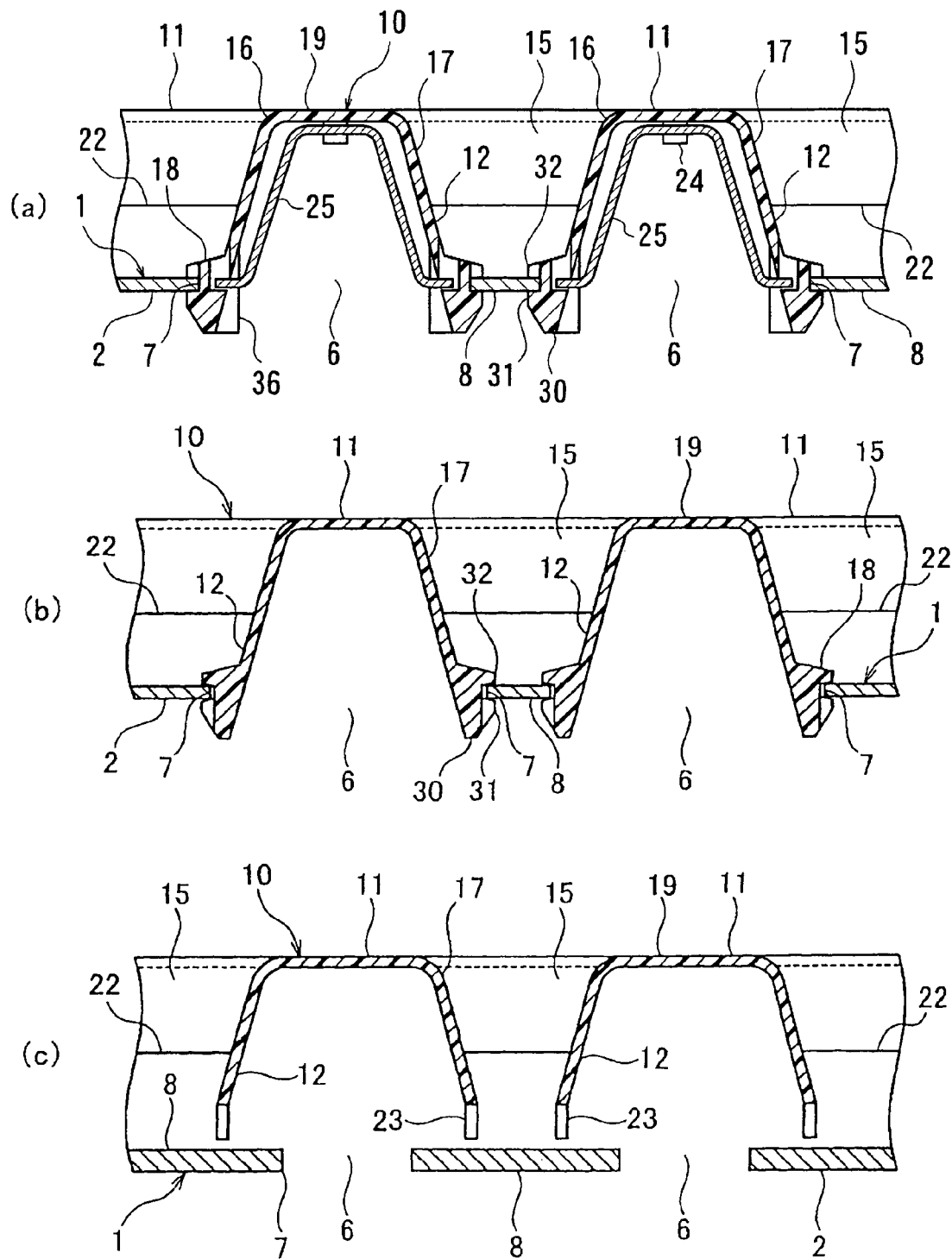
FIGS. 5(a), 5(b) and 5(c) are sectional views taken along the lines D—D, E—E and F—F of FIG. 4(a), respectively.
Figure 7:
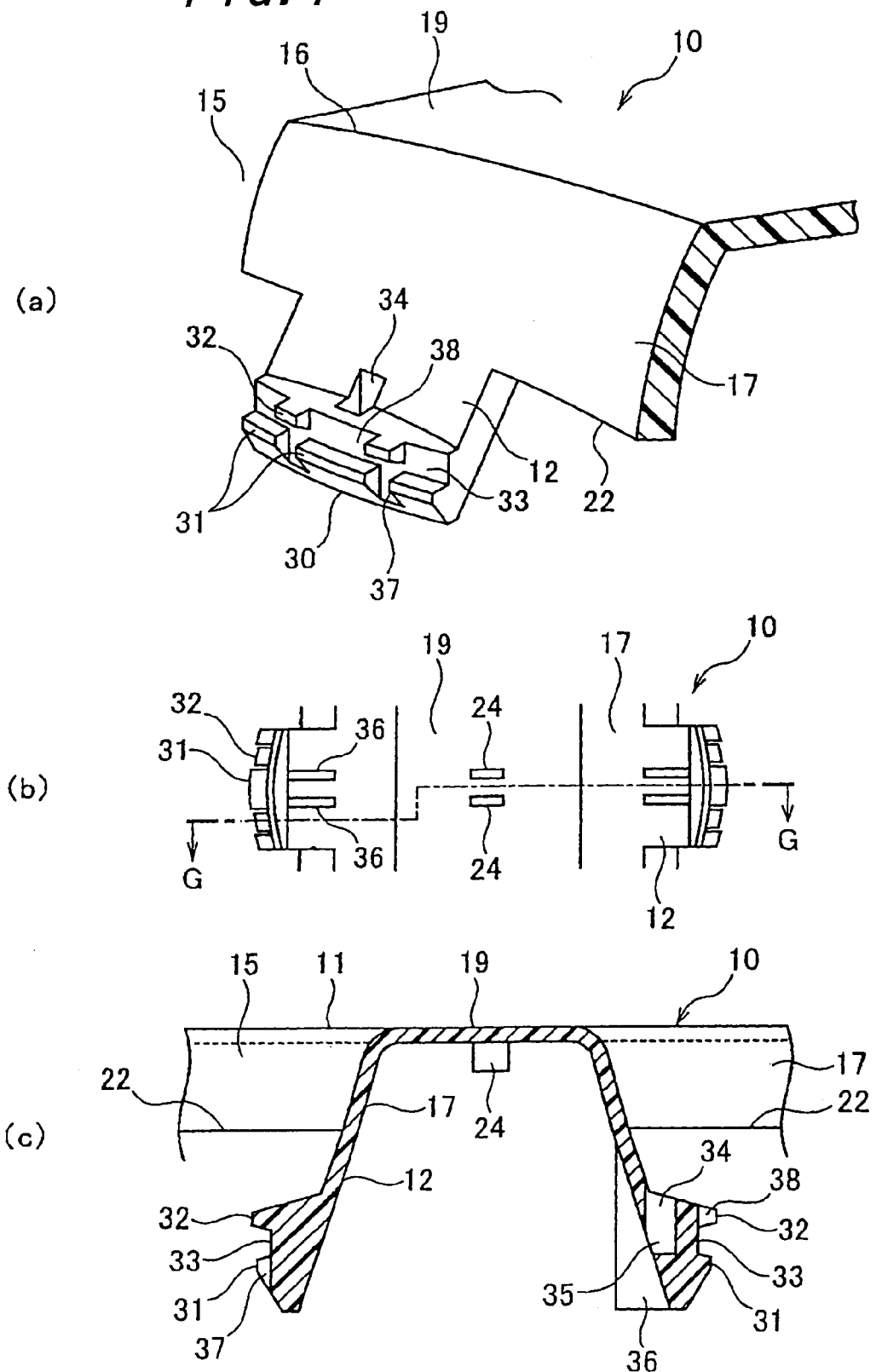
FIG. 7(a) is a perspective view of an engagement member.
FIG. 7(b) is a view showing the back surface thereof.
FIG. 7(c) is a sectional view taken along the line G—G of FIG. 7(b).

As described above with reference to FIGS. 1(a) to 1(c), the road wheel 1 for use with the wheel cover according to the present invention includes a wheel disc 2 installed to an axle of an automotive vehicle, and a wheel rim 3 for mounting a tire thereon. The wheel disc 2 has an axel-mounting hole 4 at its the center portion, bolt holes 5 for securing the road wheel 1 to the axle, which are aligned in the circumferential direction on the radially outer side of the axel-mounting hole 4, and disc openings 6 for dissipating heat, which are aligned in the circumferential direction on the radially outer side of the bolt holes 5. The wheel cover 10 is detachably mounted onto the road wheel 1 so as to cover the wheel disc 2 and the wheel rim 3 from outer side of the road wheel 1.

The wheel cover 10 has a wheel cover body 11 formed with a plurality of vent holes 15 along the outer peripheral portion of the wheel cover body 11 at positions facing solid portions 8 of the road wheel 1 between the disc openings 6 therein. The vent hole 15 has an edge portion 16, from which a conical wall 17 projects on the back surface, with inclination toward the center of the vent hole 15. An engagement member 12 projects from a part of an opening end 22 of the conical wall 17 toward the wheel disc 2, and a disc-locking portion 18 projects in a crank form from the tip end portion of the engagement member 12 toward the vent hole 15 so as to engage with a peripheral portion 7 of the disc opening 6 in the wheel disc 2. Such a wheel cover 10 may be in the form of an integrally molded product that is suitably made of a rigid resin having high rigidity and bending elasticity, such as ABS resin, polycarbonate resin, polyamide resin, or polymer alloy of polycarbonate/acrylonitrile-butadiene-styrene (PC/ABS) copolymer.

The wheel cover 10 according to the illustrated embodiment differs from the conventional wheel cover shown in FIGS. 3(a) and 3(b) in the following points. In the case of conventional wheel cover 10, the positions of the vent hole 15 and the disc opening 6 coincide with each other, the disc-locking portion 18 projects in such a manner as to be folded over a bridge portion 19 between the vent holes 15, on the opposite sides of the vent hole 15, so as to engage with the disc opening 6, and a closed space is formed by the bridge portion 19, the conical wall 17, the engagement member 12, and the solid portion 8 of the road wheel. In contrast, with reference to the wheel cover 10 according to the illustrated embodiment, the vent hole 15 is located at a position facing the solid portion 8 of the wheel disc 2 between the disc openings 6, the disc-locking portion 18 is bent into a crank form toward the vent hole 15 to engage with the disc opening 6, and a wavy or zigzag shaped cross-section is formed by the bridge portion 19, the conical wall 17, the engagement member 12, and the solid portion 8 of the wheel disc 2.

The wheel cover 11 has a generally circular shape 10 so as to cover the wheel disc 2 and the wheel rim 3, and visually mask them from the outer side of the road wheel 1. In particular, a collar portion 21 at the outer peripheral portion of the wheel cover 10 extends radially outwards over the outer peripheral portion of the wheel rim 3, so that the gap s between the road wheel 1 and the wheel cover 10 is inconspicuous. The conical wall 17 is formed so that the tip end is tapered over the entire circumference at the edge portion 16 of the vent hole 15. The two engagement members 12 project from the opposed position at one part of the opening end 22 of the conical wall 17, and a locating rib 23 extends from another part of the opening end 22 so as to contact with the outside of the disc opening 6 in the wheel disc 2. Two retainer-holding ribs 24 for holding a retainer 25 project from the back surface of the bridge portion 19 of the wheel cover body 11, at positions between the engagement members 12 thereon.

The engagement member 12 exhibits high spring elasticity when it is engaged with the wheel disc 2, and projects with inclination toward the vent hole 15 along the inclination of the conical wall 17. The disc-locking portion 18 projects toward the vent hole 15 on the side opposite to the bridge portion 19, so as to be engaged with the peripheral portion 7 of the disc opening 6. For the disc-locking portion 18, more specifically, there are provided a first locking protrusion 31 that engages with the back surface side of the peripheral portion 7 of the disc opening 6 on the projecting end portion 30 side of the engagement member 12, and a second locking protrusion 32 that engages with the outer surface side of the peripheral portion 7 on the base portion side of the first locking protrusion 31, wherein the first and second locking protrusions 31 and 32 are arranged at mutually offset positions without being aligned with each other. A locking surface 33 is formed to have a groove shape for locking the end surface of the peripheral portion 7 between both locking protrusions. Preferably, the locking surface 33 has the same curved surface as that of the peripheral portion 7, in order to increase the engagement force.

On the back surface in the central portion of the second locking protrusion 32 of the engagement member 12, a through hole 34 is formed to open on the outside in the axle direction on the vent hole 15 side, and also to open on the disc opening portion 6 side, so as to form a retainer locking concave portion 35. On both sides of the opening of the retainer locking concave portion 35, a retainer regulating rib 36 is formed in parallel with the two retainer-holding ribs 24. Reference numeral 37 denotes a first split groove for dividing the first locking protrusion 31 at the position corresponding to the second locking protrusion 32, and reference numeral 38 denotes a second split groove for dividing the second locking protrusion 32 at the position corresponding to the first locking protrusion 31. By these split grooves 37 and 38, the first locking protrusion 31 and the second locking protrusion 32 are situated at mutually offset positions, without being aligned with each other.

The retainer 25, which biases the disc-locking portion 18 toward the vent hole 15 to enhance the holding properties of the wheel cover 10, is made by cutting a metal wire into a predetermined length and bending it into substantially V-shape in which the bent portion is flat. To prevent rusting on the cut surface of the retainer 25, it is preferred that the retainer 25 is made of stainless steel, or subjected to a suitable plating that is effective for anti-rusting, such as zinc plating, aluminum alloy hot-dip plating, zinc-aluminum-magnesium alloy hot-dip plating, etc. This retainer 25 is held in its central portion between the holding ribs 24, 24 formed on the bridge portion 19 of the wheel cover 11, and is locked at both end portions in the retainer locking concave portion 35 formed into a concave form on the back surface of the locking surface 33 between the first and second locking protrusions 31 and 32 of the engagement member 12. In this way, the paired engagement members 12 that are adjacent to each other on opposite sides of the bridge portion 19 between the vent holes 15 are biased away from each other so as to be opened.

The wheel cover 10 is detachably mounted in place so as to cover the wheel disc 2. To this end, the wheel cover body 11 is arranged so as to face the wheel disc 2 so that the vent hole 15 substantially coincides with a position of the wheel disc 2 of the road wheel 1 opposed to the solid portion 8 between the disc openings 6 in the wheel disc 2. The engagement member 12 is deflected and the disc-locking portion 18 is inserted into the disc opening 6 in the wheel disc 2, so that the engagement member 12 is resiliently engaged in place, with disc-locking portion 18 locked to the peripheral portion 7 of the disc opening 6.

On this occasion, the locating rib 23 comes into contact with the outside of the disc opening 6 in the wheel disc 2 to regulate the mounting position, and the peripheral portion 7 of the disc opening 6 engages with the locking surface 33 between the first locking protrusion 31 and the second locking protrusion 32 of the engagement member 12, so as to mount the wheel cover 10 in place. The engagement member 12 may be locked by the locating rib 23 and the first locking protrusion 31, without requiring the second locking protrusion 32. However, if the peripheral portion 7 is engaged by the first locking protrusion 31 and the second locking protrusion 32 from both sides, it can be stably held without play to enhance the holding properties.

Although the wheel cover 10 can be adequately held in place without using the retainer 25, the holding properties can be enhanced when the disc-locking portion 18 is positively biased by the retainer 25. When the retainer 25 is included in the wheel cover 10, the central portion of the retainer 25 is held by the retainer-holding ribs 24, and both end portions are locked to the retainer locking concave portion 35, so that the disc-locking portion 18 is biased toward the vent hole 15. The retainer 25 may be inserted in advance in the direction of arrow a in FIG. 6(a), before the wheel cover 10 is installed and mounted to the wheel cover 10. When the engagement member 12 is deflected, the retainer 25 is also compressed simultaneously, so as to allow mounting of the wheel cover 10 onto the road wheel 1.

The retainer locking concave portion 35 is formed on the back side in the locking surface of the disc-locking portion 18, which is a position opposed to the end surface of peripheral portion 7 of the disc opening when the wheel cover is mounted in place. Therefore, deformation does not occur even if the wheel cover 10 becomes hot and the wheel disc side of the engagement member 12 is thereby softened. Also, the tip end portion of the retainer 25 is inserted in the retainer locking concave portion 35, and the disc-locking portion 18 is biased against the wheel disc 2. Therefore, the retainer 25 does not come into direct contact with the wheel 8, and this means that the wheel cover is essentially free from generation of noise, peeling-off of the paint or surface layer or resultant rusting. The retainer 25 is held by the retainer-holding ribs 24, and the retainer 25 is similarly held between the retainer regulating ribs 36, so that they are effectively prevented from falling or coming off.

It is necessary for the retainer 25 only to bias the paired engagement members 12 away from each other so as to open them, so that a large retainer like the conventional ring-shaped retainer 14 need not be used. As a result, the thickness of the engagement member 12 can be minimized and, hence, the wheel cover 10 can be made light in weight. By biasing the disc-locking portion 18 with the retainer 25, the disc-locking portion 18 is pressed toward the peripheral portion of the disc opening 6 to provide an increased locking force, by which the holding force of the wheel cover 10 can be increased. In the illustrated embodiment, the retainer 25 is used to bias the paired engagement members 12 that are adjacent to each other on the opposite sides of the bridge portion 19 between the vent holes 15, thereby increasing the pressing efficiency of each retainer 25, and reducing the weight and increasing the holding force. Also, the retainer 25 is locked to the retainer locking concave portion 35 and it is thus possible to simplify the shape thereof.

The wheel cover 10 can be mounted in place only by deflecting the engagement member 12 and locking the disc-locking portion 18 to the peripheral portion 7 of the disc opening 6, so that the required work can be completed easily and in short a time. In the mounted state, the disc-locking portion 18 is locked to the peripheral portion 7 of the disc opening 6, and the engagement member 12 assumes a resiliently engaged state, so that the mounted state of the wheel cover is stable and the holding force with respect to the road wheel 1 is large. Since the wheel cover body 11 can be provided with the collar portion 21 for covering the peripheral portion of the wheel rim 3, even if the gap s is formed between the wheel cover body 11 and the wheel rim 3, the gap s can be made inconspicuous and the wheel cover in the mounted state is thus prevented from degradation in appearance.

As described above, the vehicle wheel cover 10 according to the present invention is constructed so that the engagement member 12 projects on the wheel disc 3 side from the opening end 22 of the vent hole 15 of the wheel cover body 11 having the vent holes 15 along the circumferential direction at positions opposed to the positions between the disc openings 6, and the disc-locking portions 18 project on the vent hole 15 side from the tip end portion of the engagement member 12 so as to be locked to the peripheral portion 7 of the disc opening 6 in the wheel disc 2. Therefore, the vehicle wheel cover 10 can be manufactured at a low cost without the use of a slide mold 43, can be made light in weight, has a large holding force with respect to a road wheel 1, and moreover has an inconspicuous gap between the wheel cover 10 and the road wheel 1 to enhance decorativeness.

The above-described wheel cover 10 can be manufactured by injection molding process, in the manner to be described below with reference to FIGS. 8(a) and 8(b). To this end, there is used an injection molding die 40 which includes a stationary die plate 41 and a movable die plate 42, but which does not require slide mold members. The injection molding die 40 has parting surfaces 45 at the peripheral edge portion of the wheel cover body 11, and also at the tip end portion of the disc-locking portion 18, as shown in FIGS. 8(a) and 8(b). The movable die plate 42 is movable relative to the stationary die plate 41, and is thereby closed or opened in the axial direction indicated by arrow x. The resin is injected into a mold cavity 46 defined between a stationary die plate 41 and the movable die plate 42. As shown in FIG. 8(b), an inclined mold cavity 46 for the engagement member 12 is formed between the inclined mold surfaces of the stationary die plate 41 and the movable die plate 42 of the injection molding die 40, so as to allow formation of the inclined engagement member 12. In this case, the inclined mold surface of one of the stationary die plate 41 and the movable die plate 42 partly projects toward, and is brought into contact with the mold surface of the other die plate, so as to allow formation of the through hole 34 and the retainer locking concave portion 35. The stationary die plate 41 and the movable die plate 42 are formed with the mold surface for forming the first split groove 37 and the second split groove 38 in the axial direction indicated by arrow x. These grooves can be formed by closing or opening the movable die plate 42 in the direction of arrow x.

In this way, the wheel cover 10 according to the present invention can be manufactured easily at low cost, by injection molding process using the injection molding die 40 having only the stationary die plate 41 and the movable die plate 42, as shown in FIG. 8(b). By forming the mold cavity 46 for the inclined engagement member 12 between the inclined mold surfaces of the stationary die plate 41 and the movable die plate 42, the inclined engagement member 12 can be formed easily by injection molding. The inclination angle of the engagement member 12 is preferably within the range of 5 to 60° with respect to the advancing direction of the movable die plate 42. A part of inclined molding surface of the stationary die plate 41 and the movable die plate 42 is projected and brought into contact, so that the through hole 34 is formed only by the stationary die plate 41 and the movable die plate 42, and the retainer locking concave portion 35 can be formed easily. If the inclination angle is excessive, the engagement member 12 in the mounted state of the wheel cover becomes easily visible, so that a smaller angle is preferable. On the other hand, if the angle is insufficient, it is necessary to lengthen the engagement member 12 in order to form the through hole 34, such that the locking element of the engagement member 12 becomes readily visible from outside. Therefore, it is further preferred that the inclination angle is within the range of 10 to 30°.

In the above-described manufacturing method for the vehicle wheel cover 10, the wheel cover 10 is manufactured by injection molding process wherein resin is injected into the mold cavity 46 formed between the stationary die plate 41 and the movable die plate 42 of the injection molding die 40 having parting surfaces 45 at the peripheral edge portion of the wheel cover body 11 and at the tip end portion of the disc-locking portion 18. Therefore, the above-described wheel cover 10 can be manufactured using the mold 40 having a simple construction, by a simple operation, efficiently in high yields, and at low cost.

A modified embodiment of the present invention is shown in FIGS. 9(a) and 9(b), wherein the retainer-holding ribs 24 are provided at positions shifted radially inwards of the wheel cover from the position between the engagement members 12. The mounting method of the retainer 25 is essentially the same as that in the previous embodiment.

A further modified embodiment of the present invention is shown in FIG. 10, wherein the retainer 25 is in the form of a ring (including ellipse). By deflecting this ring-shaped retainer 25, the peripheral portion of the retainer 25 is locked to the retainer locking concave portion 35.

These modified embodiments also provide the functional advantages of the previous embodiment explained above with reference to FIG. 4(a) through FIG. 7(c).

While the present invention has been described above with reference to the illustrated embodiments, they were given by way of examples only and various changes may be made without departing from the scope of the invention as defined by the appended claims.

The invention claimed is:

1. A wheel cover to be detachably mounted onto a road wheel for an automotive vehicle, said road wheel having a wheel disc with disc openings, wherein said wheel cover comprises:
   a wheel cover body having a plurality of vent holes along the circumferential direction at positions opposed to positions of said road wheel between the disc openings in the wheel disc;
   an engagement member projecting from a peripheral portion of said vent hole toward the wheel disc; and
   a disc-locking portion projecting from a tip end portion of said engagement member toward the vent hole so as to engage with a peripheral portion of said disc opening of the wheel disc.

2. The wheel cover according to claim 1, wherein said engagement member projects with inclination toward the vent hole side.

3. The wheel cover according to claim 1, further comprising a retainer for biasing said disc-locking portion toward the vent hole.

4. The wheel cover according to claim 3, wherein a pair of said engagement members are adjacent to each other on opposite sides of a bridge portion between the vent holes, such that these engagement members are biased by said retainer away from each other, toward the respective vent holes.

5. The wheel cover according to claim 1, wherein said disc-locking portion comprises a first locking protrusion engageable with the back surface side at the peripheral portion of said disc opening, and a second locking protrusion engageable with the outer surface side at the peripheral portion of said disc opening, said first and second locking protrusions being arranged at mutually offset positions without being aligned with each other.

6. The wheel cover according to claim 3, wherein said engagement member comprises a retainer locking portion for locking said retainer.

7. The wheel cover according to claim 6, wherein said retainer locking portion is formed on the back side of the locking surface of said disc-locking portion, which is a position opposed to the end surface of the peripheral portion of said disc opening when the wheel cover is secured to the road wheel.

8. The wheel cover according to claim 3, wherein said wheel cover body comprises a retainer-holding portion for holding said retainer.

9. The wheel cover according to claim 2, further comprising a retainer for biasing said disc-locking portion toward the vent hole.

10. The wheel cover according to claim 2, wherein said disc-locking portion comprises a first locking protrusion engageable with the back surface side at the peripheral portion of said disc opening, and a second locking protrusion engageable with the outer surface side at the peripheral portion of said disc opening, said first and second locking protrusions being arranged at mutually offset positions without being aligned with each other.

11. The wheel cover according to claim 3, wherein said disc-locking portion comprises a first locking protrusion engageable with the back surface side at the peripheral portion of said disc opening, and a second locking protrusion engageable with the outer surface side at the peripheral portion of said disc opening, said first and second locking protrusions being arranged at mutually offset positions without being aligned with each other.

12. The wheel cover according to claim 4, wherein said disc-locking portion comprises a first locking protrusion engageable with the back surface side at the peripheral portion of said disc opening, and a second locking protrusion engageable with the outer surface side at the peripheral portion of said disc opening, said first and second locking protrusions being arranged at mutually offset positions without being aligned with each other.

13. The wheel cover according to claim 4, wherein said engagement member comprises a retainer locking portion for locking said retainer.

14. The wheel cover according to claim 5, wherein said engagement member comprises a retainer locking portion for locking said retainer.

15. The wheel cover according to claim 4, wherein said wheel cover body comprises a retainer-holding portion for holding said retainer.

16. The wheel cover according to claim 5, wherein said wheel cover body comprises a retainer-holding portion for holding said retainer.

17. The wheel cover according to claim 6, wherein said wheel cover body comprises a retainer-holding portion for holding said retainer.

18. The wheel cover according to claim 7, wherein said wheel cover body comprises a retainer-holding portion for holding said retainer.

* * * * *